United States Patent
Pinzone et al.

(10) Patent No.: US 11,083,188 B2
(45) Date of Patent: *Aug. 10, 2021

(54) PEST TRAP MONITOR

(71) Applicant: Kness Mfg. Co., Inc., Albia, IA (US)

(72) Inventors: Joseph F. Pinzone, Huntersville, NC (US); Collin Jackson, Huntersville, NC (US)

(73) Assignee: Kness Mfg. Co., Inc., Albia, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,058

(22) Filed: Jan. 2, 2020

(65) Prior Publication Data
US 2020/0146277 A1 May 14, 2020

Related U.S. Application Data

(63) Continuation of application No. 15/423,880, filed on Feb. 3, 2017, now Pat. No. 10,532,653.

(60) Provisional application No. 62/290,767, filed on Feb. 3, 2016.

(51) Int. Cl.
| | | |
|---|---|---|
| *A01M 31/00* | (2006.01) | |
| *A01M 23/24* | (2006.01) | |
| *A01M 23/16* | (2006.01) | |

(52) U.S. Cl.
CPC .......... *A01M 31/002* (2013.01); *A01M 23/16* (2013.01); *A01M 23/245* (2013.01)

(58) Field of Classification Search
CPC ... A01M 31/002; A01M 23/16; A01M 23/245
See application file for complete search history.

(56) References Cited

U.S. PATENT DOCUMENTS

| | | | | |
|---|---|---|---|---|
| 5,571,967 A * | 11/1996 | Tanaka | ..................... | G01N 3/42 340/573.2 |
| 6,137,415 A * | 10/2000 | Rast | .................... | A01M 23/245 340/384.1 |
| 6,202,340 B1* | 3/2001 | Nieves | .................. | A01M 23/02 43/61 |
| 6,445,301 B1* | 9/2002 | Farrell | ................ | A01M 31/002 340/384.2 |
| 7,026,942 B2* | 4/2006 | Cristofori | ............. | A01M 23/04 340/384.2 |
| 7,719,429 B2* | 5/2010 | Barber | .................. | A01M 1/026 340/321 |
| 8,387,304 B2* | 3/2013 | Cink | .................... | A01M 25/004 43/131 |
| 9,015,987 B2* | 4/2015 | Moran | .................. | A01M 23/16 340/573.2 |
| 2003/0213161 A1* | 11/2003 | Gardner, Jr. | .......... | A01M 1/026 43/61 |
| 2004/0020100 A1* | 2/2004 | O'Brien | ................ | A01M 23/30 43/1 |
| 2009/0151221 A1* | 6/2009 | Daley | ................. | A01M 23/245 43/58 |

(Continued)

*Primary Examiner* — Adnan Aziz

(74) *Attorney, Agent, or Firm* — Nyemaster Goode, P.C.

(57) ABSTRACT

Disclosed are various embodiments for a trap monitor. The trap monitor can detect when a trap is triggered using a magnetic interlock attached to the trap and a magnetic flux sensor. The trap monitors may forward trap events and other information to a central hub for communication to a server. The trap monitors and hub can be configured using infrared transmissions from a mobile device.

17 Claims, 10 Drawing Sheets

(56) References Cited

U.S. PATENT DOCUMENTS

| | | | |
|---|---|---|---|
| 2010/0050498 A1* | 3/2010 | Nelson | A01M 25/004 43/60 |
| 2011/0083358 A1* | 4/2011 | Slotnick | A01M 23/30 43/81 |
| 2013/0031824 A1* | 2/2013 | Arlichson | A01M 23/18 43/60 |
| 2014/0300477 A1* | 10/2014 | Rich | A01M 99/00 340/573.2 |
| 2014/0325892 A1* | 11/2014 | Borth | A01M 1/026 43/58 |
| 2018/0199565 A1* | 7/2018 | Zosimadis | G08C 23/04 |
| 2019/0029244 A1* | 1/2019 | Steele | A01M 1/06 |

* cited by examiner

PEST TRAP MONITOR

CROSS-REFERENCE TO RELATED APPLICATIONS

This application is a continuation of, and claims priority to, U.S. patent application Ser. No. 15/423,880, filed Feb. 3, 2017, now U.S. Pat. No. 10,531,653, entitled "PEST TRAP MONITOR", which claims the benefit of and priority to U.S. Provisional Patent Application No. 62/290,767, entitled "PEST TRAP MONITOR", filed on Feb. 3, 2016, which are incorporated herein by reference in their entireties.

BACKGROUND

Traps may be deployed to control pest populations. It may be difficult large installations including multiple traps.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Various traps may be deployed to control pest populations, to determine whether pests are living in a particular area, or for other purposes. Such traps may include lethal traps, such as snap traps, as well as non-lethal traps, such as live traps and multitraps. According to various embodiments, trap monitors may be coupled to these traps to determine whether the trap has been triggered. This allows a user to know when a trap has been triggered without requiring manual inspection of the trap. On triggering, the trap monitor transmit a trap triggering event to a central hub in communication with a server. As the central hub may receive transmissions from multiple sensors, this allows for multiple traps to be deployed in a given area, each with their own trap monitor. By forwarding the trap triggering event to the server, a user may access the server via a browser interface or dedicated application to determine the status of the various traps being deployed. The server may also communicate push notifications, text messages, or other notifications to the user upon a trap triggering event.

To determine if a trap has been triggered, a trap monitor includes a magnetic flux sensor. A magnetic interlock is coupled to a movable portion of the trap, such as a door or hammer arm. The magnetic interlock also includes a magnet producing a magnetic field detectable by the magnetic flux sensor. When the trap is triggered, the magnetic interlock is set into motion as it is coupled to the movable portion of the trap. This causes the magnet to also move, producing a change in magnetic flux detectable by the magnetic flux sensor. When the change in magnetic flux is detected, the sensor transmits the trap trigger event to the central hub.

Various parameters used by the trap monitors and the hub may need to be configured to ensure proper operation. The parameters may be defined via a web interface or application. The parameters may then be encoded as a waveform for download to a mobile device. The mobile device then transmits the parameters to infrared receivers on the trap monitors and hub using an infrared transmitter installed in an output port by playing the waveform. In addition, there are other features and aspects of the various embodiments will be described below.

In the following discussion, a further description of the system and its components is provided, followed by a discussion of the operation of the same.

Figure 1A:
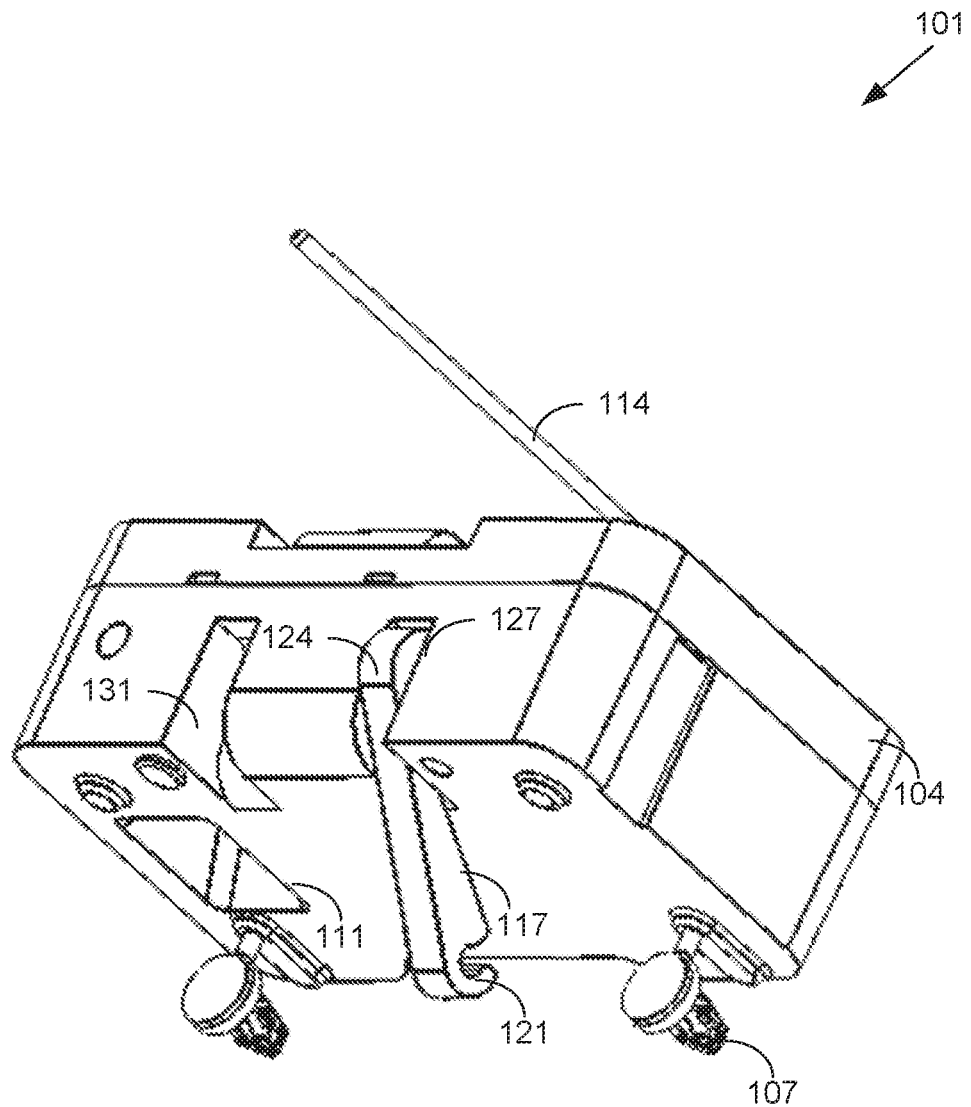
FIGS. 1A and 1B are drawings depicting views of a trap monitor according to various embodiments of the present disclosure.

With reference to FIG. 1A, shown is an example drawing depicting a trap monitor 101 according to various embodiments. To begin, the trap monitor 101 includes an enclosure 104 surrounding components of the trap monitor 101. Affixed to the enclosure 104 are push rivets 107 to attach the trap monitor 101 to a trap or base. Alternatively, screws, nails, adhesives, or other approaches may be used to attach the trap monitor 101 to a trap or base. A motion sensor 111 such as a passive infrared sensor is recessed into the enclosure 104. An antenna 114 for a radio frequency (RF) transmitter or transceiver extends from the enclosure 104.

A magnetic interlock 117 is also shown with the trap monitor 101. The magnetic interlock 117 includes a clip 121 to attach to a hammer or other moving portion of a trap. Although the magnetic interlock 117 is depicted with a clip 121, it is understood that other attachment mechanisms may also be used to attach the magnetic interlock 117 to a trap, such as a hook, loop, clamp, adhesive, or other approach as can be appreciated. Additionally, although the magnetic interlock 117 is depicted as a rigid body, it is understood that the magnetic interlock 117 may be composed from a non-rigid structure, such as a string.

Also included in the magnetic interlock 117 is a magnet 124 at an end of the magnetic interlock 117 opposing the clip 121. The magnet 124 end is then placed in a recess 127 or 131 having a magnetic flux sensor within the enclosure 104. When a trap is triggered, the magnetic interlock 117 attached to the moving portion of the trap moves, creating a change in magnetic flux due to the movement of the magnet 124. By detecting the magnetic flux, the trap monitor 101 can determine when a trap is triggered.

Figure 1B:
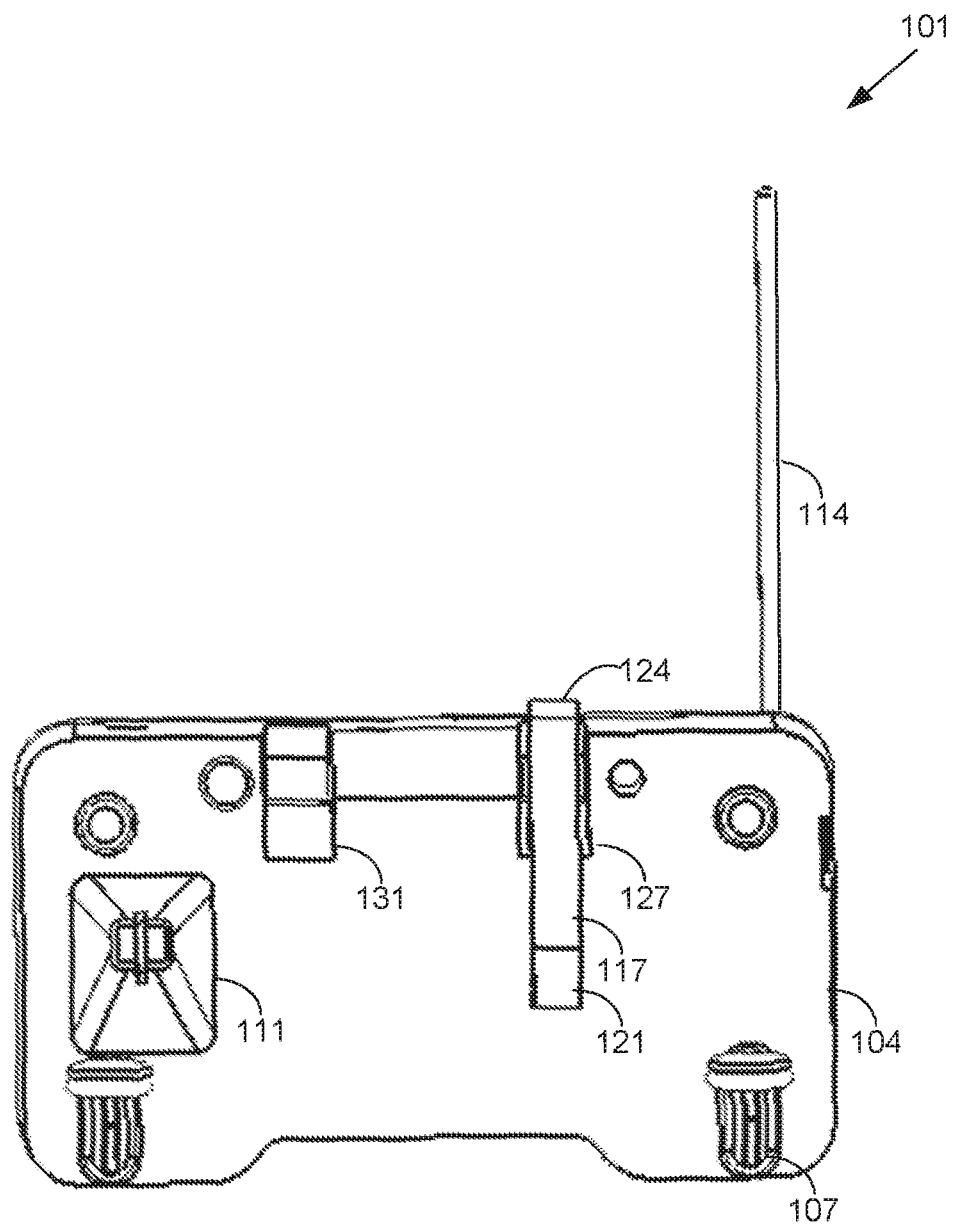

Turning now to FIG. 1B, shown is an alternative view of the trap monitor 101 according to various embodiments.

Depicted in the alternative view are the enclosure 104, push rivets 107, motion sensor 111, antenna 114, and recesses 127 and 131 of the trap monitor 101 as discussed above in FIG. 1A. Also shown are the magnetic interlock 117, having the clip 121 and magnet 124 discussed above in FIG. 1A.

Figure 2:
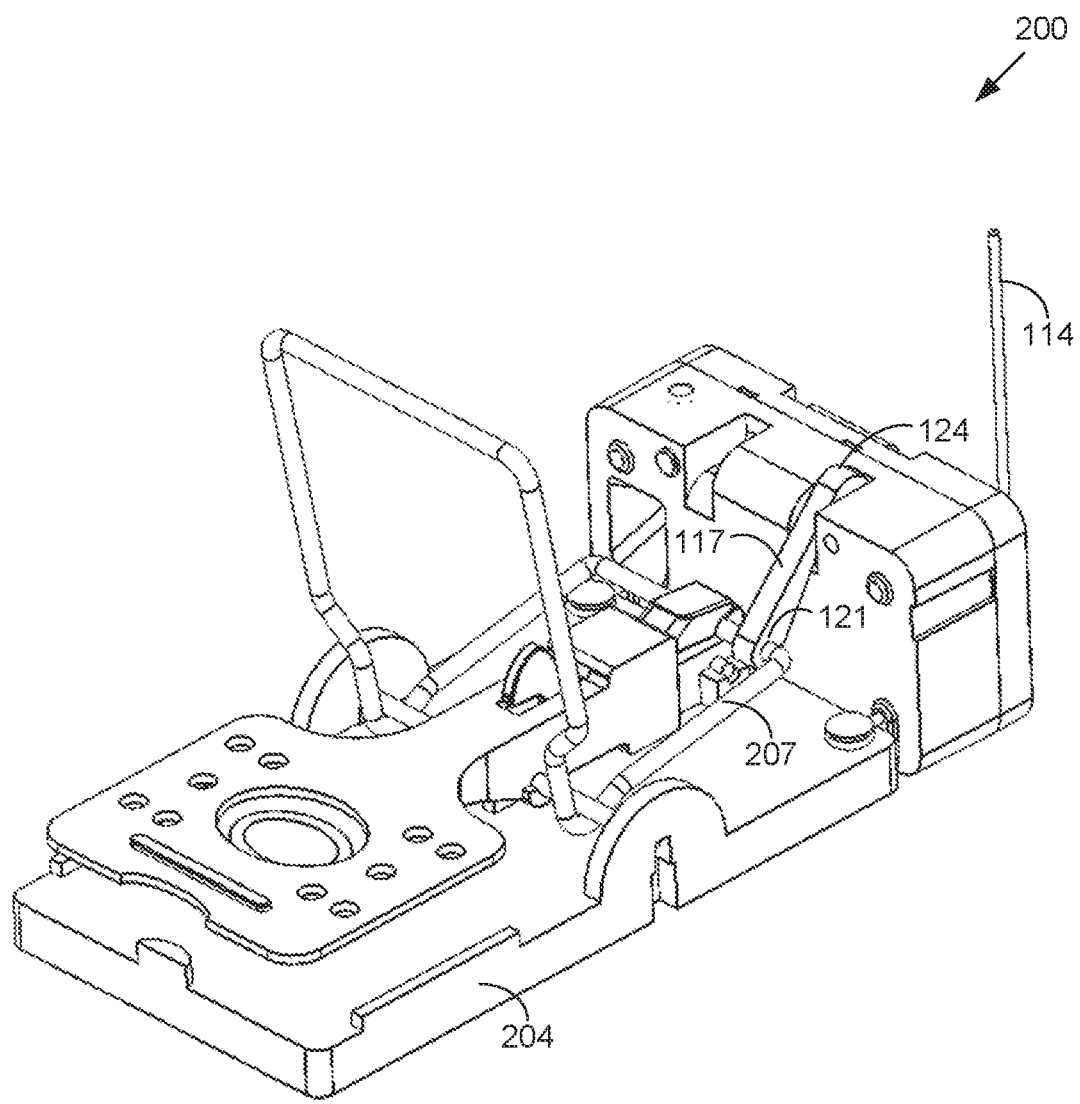
FIG. 2 is a drawing depicting a trap monitor coupled to a snap trap according to various embodiments of the present disclosure.

Moving on to FIG. 2, shown is an example deployment 201 of a trap monitor 101 (FIG. 1A) on a snap trap 204 according to an embodiment of the present disclosure. The clip 121 of the magnetic interlock 117 is attached to a hammer 207 of the snap trap 204. On triggering of the snap trap 204, the motion of the hammer 207 causes the magnetic interlock 117 to be removed from the recess 127 (FIG. 1A) of the enclosure 104 (FIG. 1A), thereby generating a change in magnetic flux due to the movement of the magnet 124 relative to a magnetic flux sensor. The trap monitor 101 detects the change in magnetic flux with the magnetic flux sensor, and transmits a trap trigger event to a central hub via the antenna 114.

Figure 3:
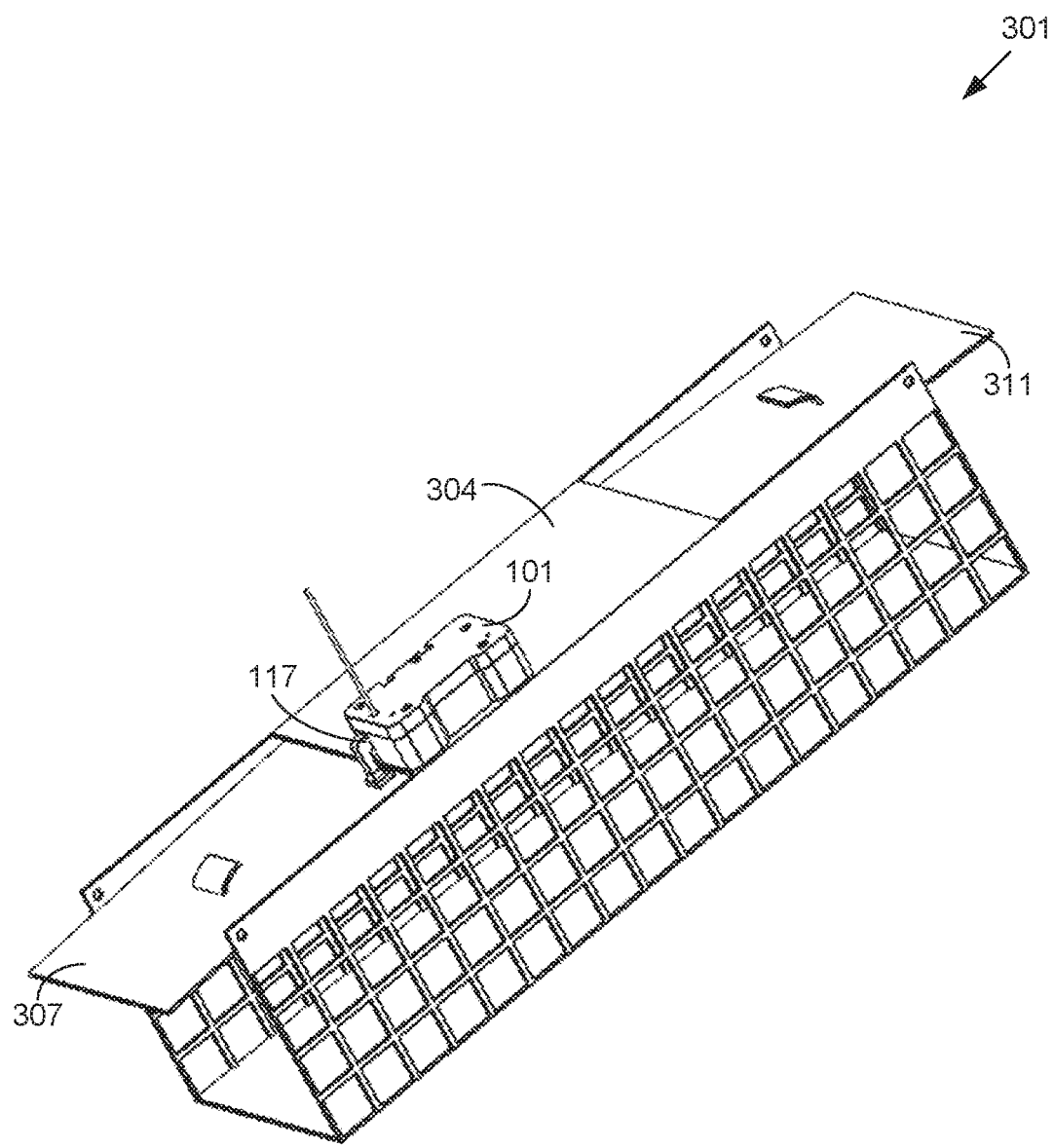
FIG. 3 is a drawing depicting a trap monitor coupled to a live trap according to various embodiments of the present disclosure.

Referring next to FIG. 3, shown is an example deployment 301 of a trap monitor 101 (FIG. 1A) on a live trap 304 according to an embodiment of the present disclosure. The magnetic interlock 117 is attached to a door 307 of the live trap 304. On triggering of the live trap 304, the doors 307 and 311 drop, thereby enclosing a pest within the live trap 304. The motion of the door 307 causes the magnetic interlock 117 to be removed from a recess of the enclosure 104 (FIG. 1A), thereby generating a change in magnetic flux due to the movement of the magnet 124 (FIG. 1A). The trap monitor 101 detects the magnetic flux with a magnetic flux sensor, and transmits a trap trigger event to a central hub via the antenna 114 (FIG. 1A).

Figure 4:
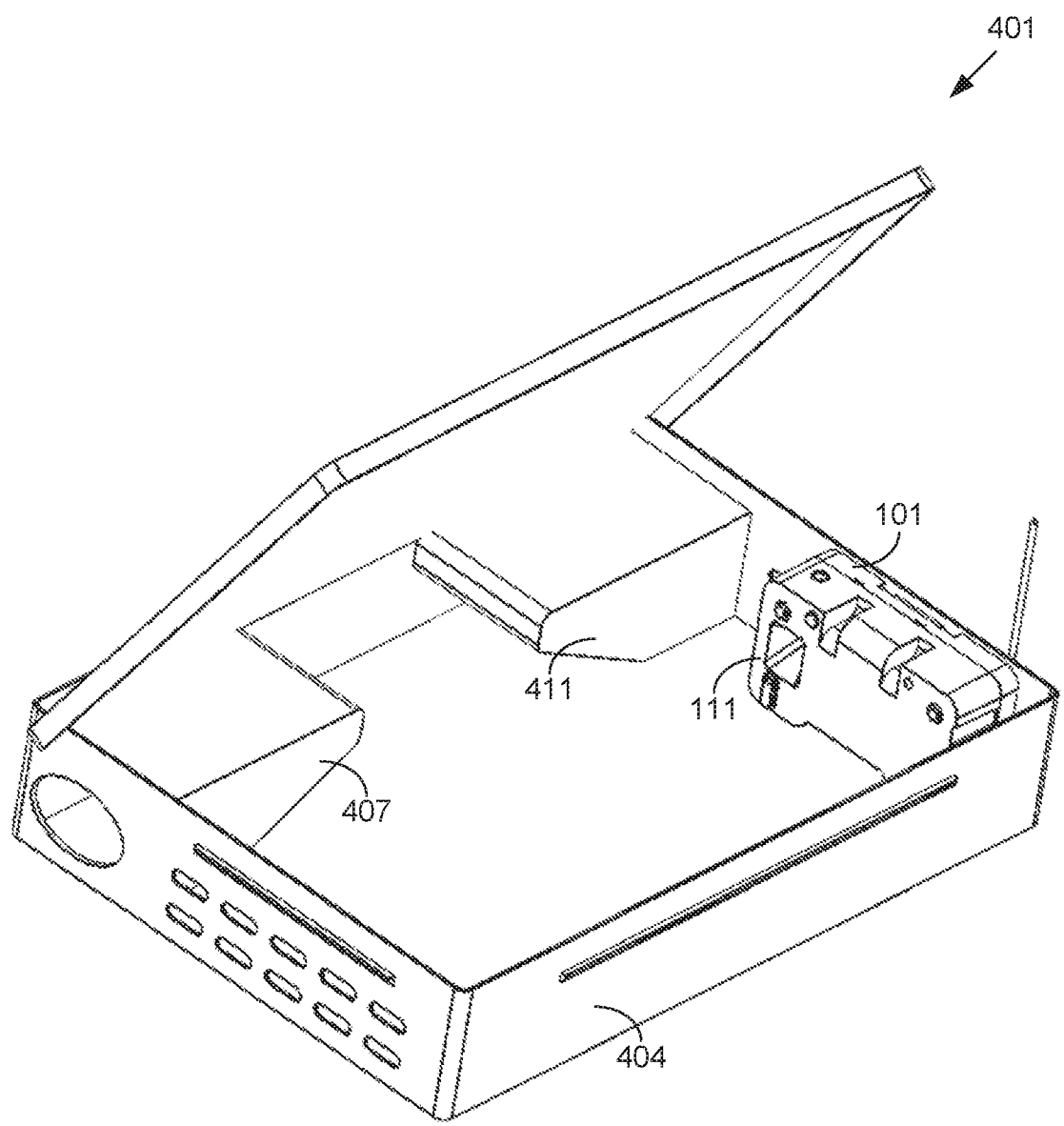
FIG. 4 is a drawing depicting a trap monitor within a multitrap according to various embodiments of the present disclosure.

Turning now to FIG. 4, shown is an example deployment 401 of a trap monitor 101 (FIG. 1A) on a multitrap 404 according to an embodiment of the present disclosure. The multitrap 404 includes entrances 407 and 411, through which a pest can enter the multitrap 404. The entrances 407 and 411 include a ramp that lowers when stepped on by a pest, allowing a pest to enter the multitrap 404. Once the pest steps off the ramp, the ramps return to a raised position, preventing the pest from leaving the multitrap 404. In this example deployment 401, the trap monitor 101 does not use a magnetic interlock 117 (FIG. 1A). Instead, the trap monitor 101 is configured to communicate a trap trigger event to the hub on detection of motion by the motion sensor 111.

Figure 5:
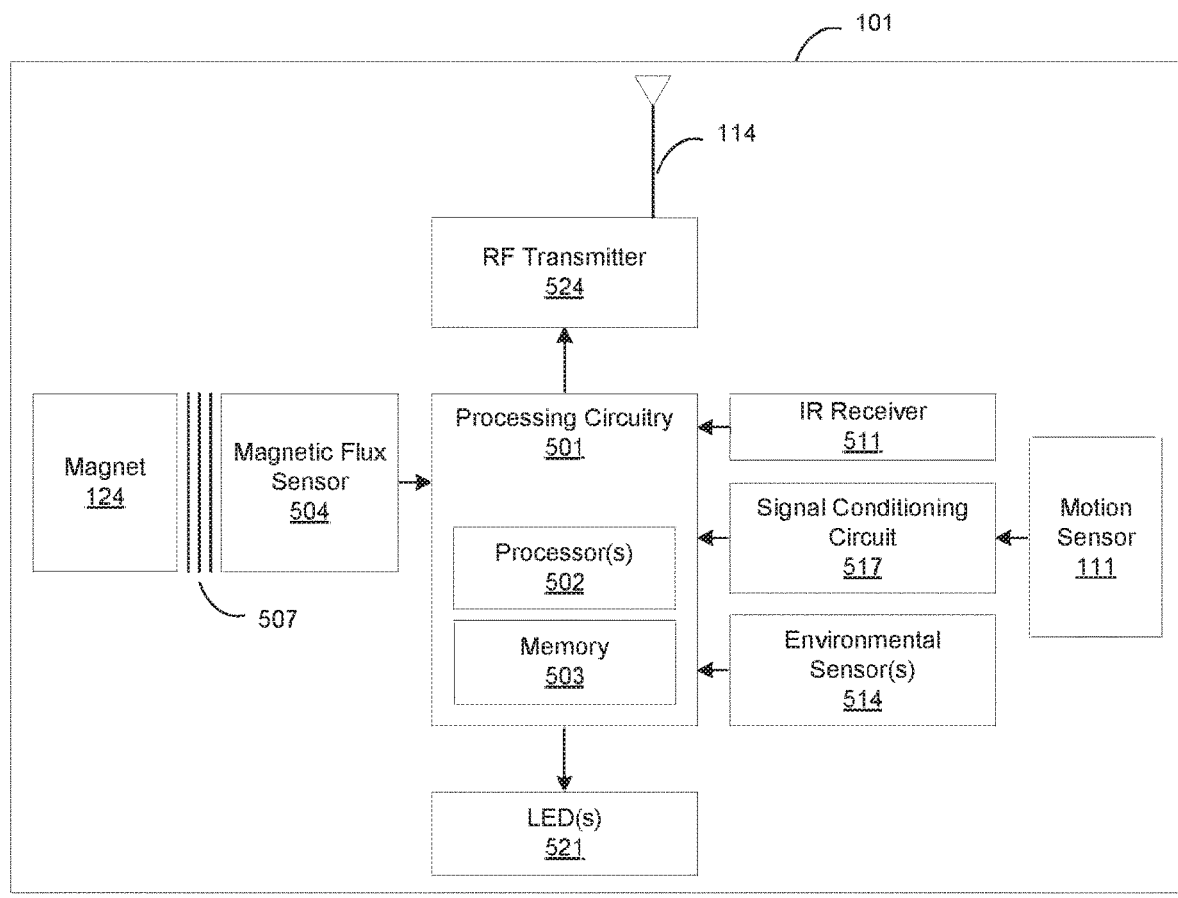
FIG. 5 is a block diagram depicting components of a trap monitor according to various embodiments of the present disclosure.

Moving on to FIG. 5, shown is a schematic block diagram of the trap monitor 101 according to an embodiment of the present disclosure. The trap monitor 101 includes processing circuitry 501. The processing circuitry 501 may include at least one processor circuit 502, for example, having a processor and a memory 503, both of which are coupled to a local interface. Stored in the memory are both data and several components that are executable by the processor, such as embedded software or logic. It is understood that there may be other applications that are stored in the memory 503 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 503 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 503 and run by the processor 502, source code that may be expressed in proper format such as object code that is capable of being loaded into a random access portion of the memory 503 and executed by the processor 502, or source code that may be interpreted by another executable program to generate instructions in a random access portion of the memory 503 to be executed by the processor 502, etc. An executable program may be stored in any portion or component of the memory 503 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 503 is defined herein as including both volatile and nonvolatile memory and data storage components. Volatile components are those that do not retain data values upon loss of power. Nonvolatile components are those that retain data upon a loss of power. Thus, the memory 503 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 503 may represent multiple memories 503 that operate in parallel processing circuits, respectively. In such a case, the local interface may be an appropriate network that facilitates communication between any two of the multiple processors 502, between any processor 502 and any of the memories 503, or between any two of the memories 503, etc. The local interface may comprise additional systems designed to coordinate this communication, including, for example, performing load balancing. The processor 502 may be of electrical or of some other available construction.

The trap monitor 101 also includes one or more magnetic flux sensors 504 configured to detect a change in magnetic flux in a magnetic field 507 due to movement of a magnet 124 (FIG. 1) relative to the magnetic flux sensor. Additional sensors of the trap monitor 101 may include an infrared (IR) receiver 511, a motion sensor 111, environmental sensors 514, and/or other sensors. The IR receiver 511 operates to receive infrared signals encoding data facilitating the operation of the trap monitor 101. For example, the IR receiver 511 may receive in infrared signal encoding configuration data defining one or more operational parameters of the trap monitor 101 as will be described below. In some embodiments, the IR receiver 511 may function as an IR transceiver.

The motion sensor 111 operates to detect the movement of objects near the trap monitor 101. For example, the motion sensor 111 may detect the movement of pests within a trap such as a live trap or multitrap. The motion sensor 111 may also detect the movement of pests around or near a trap. Accordingly, the motion sensor 111 may detect the movement of pests when the trap to which the trap monitor 101 is deployed is in a triggered state or in an untriggered state. The motion sensor 111 may include, for example, a passive infrared (PIR) sensor or another type of motion sensor. Additionally, the motion sensor 111 may provide output to the processing circuitry 501 via a signal conditioning circuit 517.

The environmental sensors 514 operate to provide data describing the state of the environment in which a respective trap monitor 101 is deployed. The environmental sensors 514 may include, for example, temperature sensors, humidity sensors, dew point sensors, light sensors, audio sensors, or other sensors as can be appreciated.

Output from the processing circuitry may be provided to one or more light emitting diodes 521 (LEDs). The LEDs 521 may thus serve to indicate an operational status of the trap monitor 101. Additionally, data output from the processing circuitry 501 may be transmitted to a central hub using a radio frequency (RF) transmitter 524 having an antenna 114 (FIG. 1A), as will be described in further detail below. The RF transmitter 524 may function as an RF transceiver.

Figure 6:
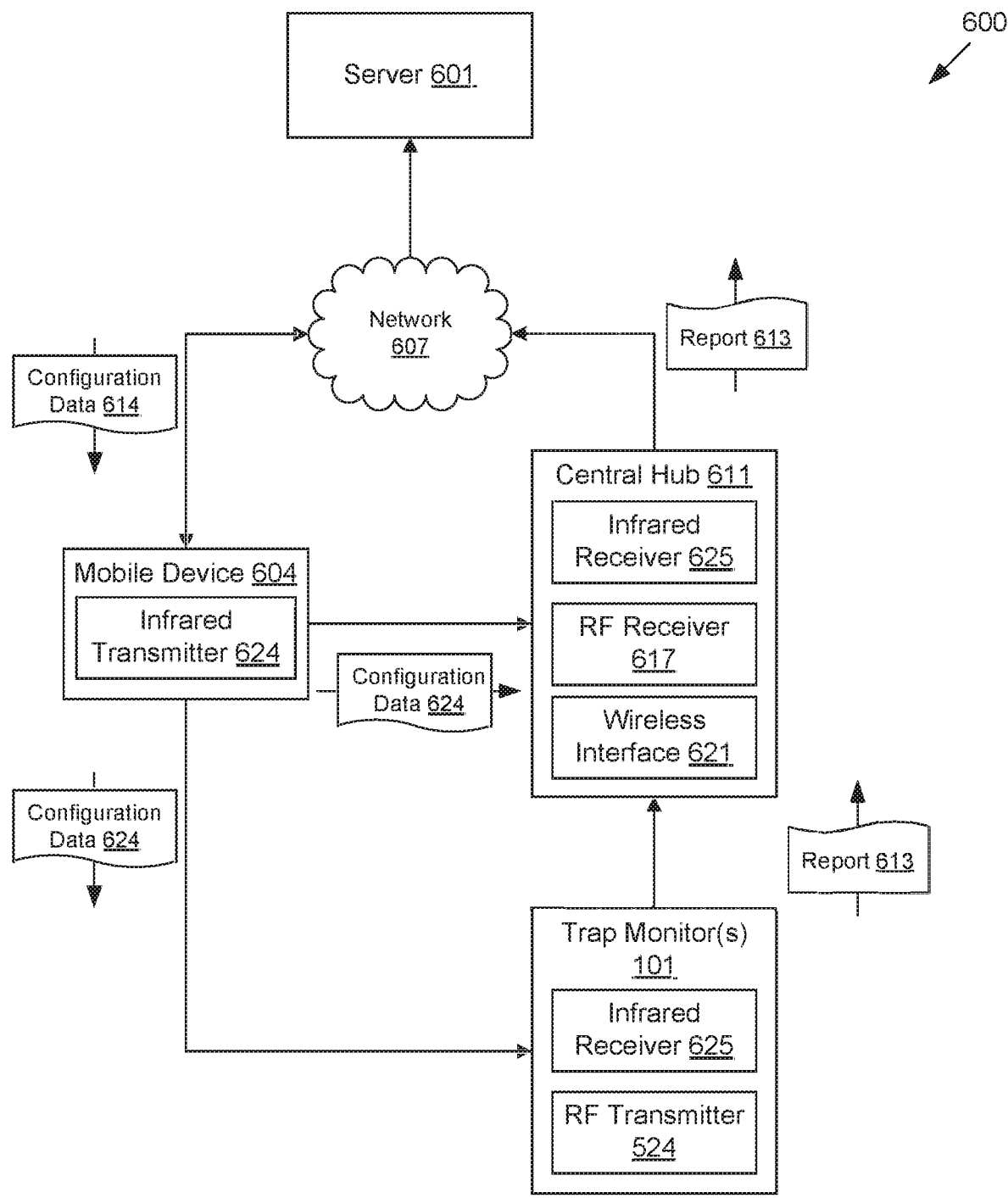
FIG. 6 is a drawing depicting a system deploying trap monitors according to various embodiments of the present disclosure.

Moving on to FIG. 6, shown is a networked environment 600 according to various embodiments. The networked environment 600 includes a server 601 and a mobile device 604, which are in data communication with each other via a network 607. Also in communication with the server 601 via the network 107 is a central hub 611. The network 607 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The server 601 may comprise, for example, a computer or any other system providing computing capability. Alternatively, the server 601 may employ a plurality of computing devices that may be arranged, for example, in one or more server banks or computer banks or other arrangements. Such computing devices may be located in a single installation or may be distributed among many different geographical locations. For example, the server 601 may include a plurality of computing devices that together may comprise a hosted computing resource, a grid computing resource and/or any other distributed computing arrangement. In some cases, the server 601 may correspond to an elastic computing resource where the allotted capacity of processing, network, storage, or other computing-related resources may vary over time.

The mobile device 604 is representative of a plurality of client devices that may be coupled to the network 607. The mobile device 604 may comprise, for example, a processor-based system such as a computer system. Such a computer system may be embodied in the form of a laptop computer, personal digital assistants, cellular telephones, smartphones, web pads, tablet computer systems, game consoles, or other devices with like capability. It is understood that other computing devices may also be used to perform the functionality described as being performed by the mobile device 604, such as a desktop or stationary computer, or other computing device. The mobile device 604 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The mobile device 604 may be configured to execute various applications. Such applications may be executed in the mobile device 604, for example, to access network content served up by the server 601 and/or other servers, thereby rendering a user interface on the display.

The central hub 611 serves as a communications relay between one or more trap monitors 101 and the server 601. To this end, the central hub 611 may operate as a processor based system such as a computer system. The central hub 611 receives reports 613 of trap activity from the trap monitors 101, as will be described in more detail below. The central hub 611 then communicates these reports 613 to the server 601 via the network 607. In some embodiments, the central hub 611 may be implemented and operate distinct from the trap monitors 101. In other embodiments, a trap monitor 101 may perform the functionality of the central hub 611.

Next, a general description of the operation of the various components of the networked environment 600 is provided. To begin, the mobile device 604 or another device accesses the server 601 to generate configuration data 614. Configuration data 614 defines operational parameters of trap monitors 101 or the central hub 611. Configuration data 614 may include, for example, operational frequencies for a radio frequency (RF) transmitter 524 of a trap monitor 101 or an RF receiver 617 of a central hub 611. Configuration data 614 may also include parameters for connecting the central hub 611 to the network 607 by a wireless interface 621 such as a cellular interface or wireless local area network (WLAN) interface. Such parameters may include a wireless channel or frequency, service set identifier (SSID), password, security or encryption algorithm, or other parameters. Configuration data 614 may include encryption keys, decryption keys, encryption algorithms, or other parameters for encryption communications between trap monitors 101, the central hub 611, or the server 601. Additionally, configuration data 601 may include user identifying information to facilitate the storage or management of report 613 data, such as a user identifier, password, authentication credential, or other data as can be appreciated. The configuration data 601 may also include location identifying information for the respective trap monitor 101 or central hub 611.

After the configuration data 614 has been defined, the server 601 encodes the configuration data 614 as an audio waveform, which is downloaded by or otherwise communicated to the mobile device 604. To transmit the configuration data 614 to the central hub 611 or the trap monitors 101, the mobile device 604 plays the audio waveform encoding of the configuration data 614 while an infrared transmitter 624 is connected to an output port of the mobile device 604. The output port can include an audio output port, a data output port such as a Universal Serial Bus (USB) port, or another output port. The infrared transmitter 624 transforms output into an infrared signal. Thus, by playing the audio waveform encoding the configuration data 614, the configuration data 614 is transformed by the infrared transmitter 624 into an infrared signal receivable by an infrared receiver 625 of the trap monitor 101 or the central hub 611.

In some embodiments, the central hub 611 or trap monitors 101 may be configured to activate their respective infrared receivers 625 at a predefined interval to determine if an infrared signal is being transmitted. In such an embodiment, the mobile device 604 may transmit a preamble infrared signal through the infrared transmitter 624 for a duration meeting or exceeding the predefined interval. On activating the infrared receiver 625, the trap monitor 101 or central hub 611 would receive the preamble signal, and then continue to leave the infrared receiver 625 active to receive the configuration data 614 signal. In some embodiments, the trap monitor 101 or central hub 611 may verify or validate the preamble signal using a checksum, hash, or other value. In such an embodiment, the infrared receivers 111 would only remain active to receive the configuration data 614 upon successful validation. After receiving the configuration data 614, the trap monitors 101 or central hub 611 apply the configuration data 614 by setting their respective operational parameters according to the configuration data 614.

Upon configuration, the trap monitors 101 may communicate reports 613 to the central hub 611 in response to various conditions. For example, the trap monitor 101 may communicate a report 613 to the central hub 611 in response to a trap trigger event, at a predefined interval, in response to motion detected by a motion sensor 625 (FIG. 6), or in response to another event. The report 613 may indicate an identifier for the respective trap monitor 101 transmitting the report 613, environmental data such as humidity, temperature, or dew point, whether or not motion was detected, or other data as can be appreciated. The trap monitor 101 may transmit the report 613 to the central hub 611 using a radio frequency (RF) transmitter 524, which is received by an RF receiver 617 of the central hub 611.

The central hub 611 then communicates reports 613 aggregated from trap monitors 101 to the server 601 via the network 607. In some embodiments, the central hub 611 may forward the report 613 to the server 601 on receipt of the report 613 from the trap monitor 101. In other embodiments, the central hub 611 may aggregate reports 613 and communicate the aggregated reports 613 at a predefined interval, or in response to other criteria. The server 601 then stores the reports 613 in a data store, data base, or by another approach as can be appreciated.

Figure 7:
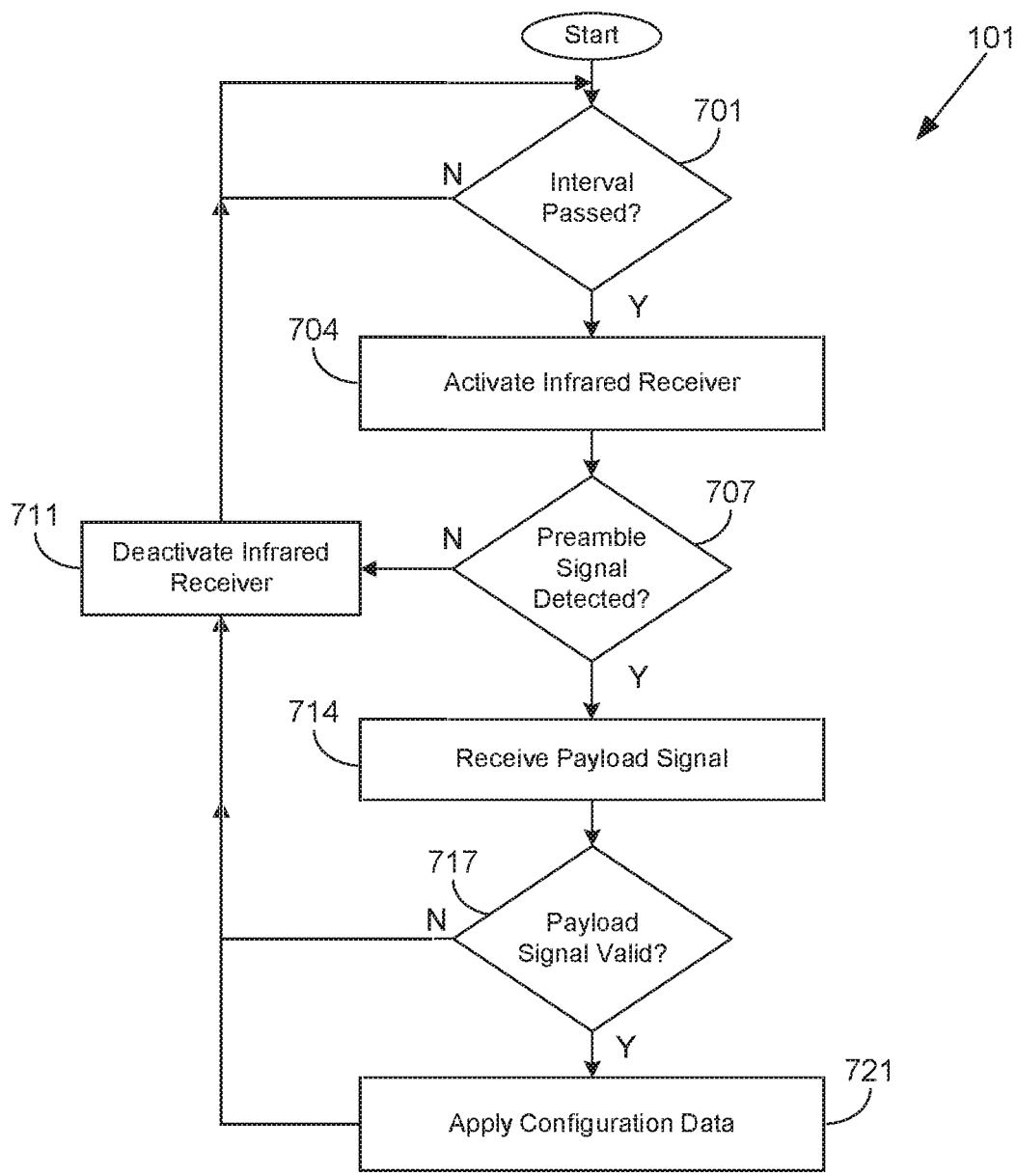
FIG. 7 is a flowchart illustrating one example of functionality implemented by a trap monitor according to various embodiments of the present disclosure.

Turning now to FIG. 7, shown is a flowchart that provides one example of the operation of a portion of the trap monitor 101 according to various embodiments. It is understood that the flowchart of FIG. 7 provides merely an example of the many different types of functional arrangements that may be employed to implement the operation of the portion of the trap monitor 101 as described herein. As an alternative, the flowchart of FIG. 7 may be viewed as depicting an example of elements of a method implemented in the trap monitor 101 according to one or more embodiments.

Beginning with box 701, the trap monitor 101 waits until a predefined interval has passed. After the predefined interval, in box 704, the trap monitor 101 activates an infrared receiver 511 (FIG. 5). In box 707, the trap monitor 101 determines if a preamble signal has been detected by the infrared receiver 511. If not, the infrared receiver 511 is deactivated in box 711 and the process returns to box 701 until the passage of another predefined interval.

If a preamble signal is detected, the process advances to box 714 where the trap monitor 101 infrared receiver 511 receives a payload signal encoding configuration data 614 (FIG. 6) for the trap monitor 101. Next, in box 717 the trap monitor 101 determines if the payload signal is valid. This may include calculating a checksum, hash, cyclical redundancy check, or other aggregate value based on the data encoded by the payload signal. This may also include determining if one or more values or attributes are defined or included in the payload signal. If the payload signal is not valid, the process advances to box 711 where the infrared receiver 511 is deactivated and the trap monitor 101 waits for another interval passage at box 701. If the payload signal is valid, the process advances to box 721 where the trap monitor 101 applies the configuration data 614 by setting one or more operational parameters according to the configuration data 614. The process then advances to box 711, where the infrared receiver 511 is deactivated. Finally, the process returns to box 701 to wait for the passage of another predefined interval.

Figure 8:
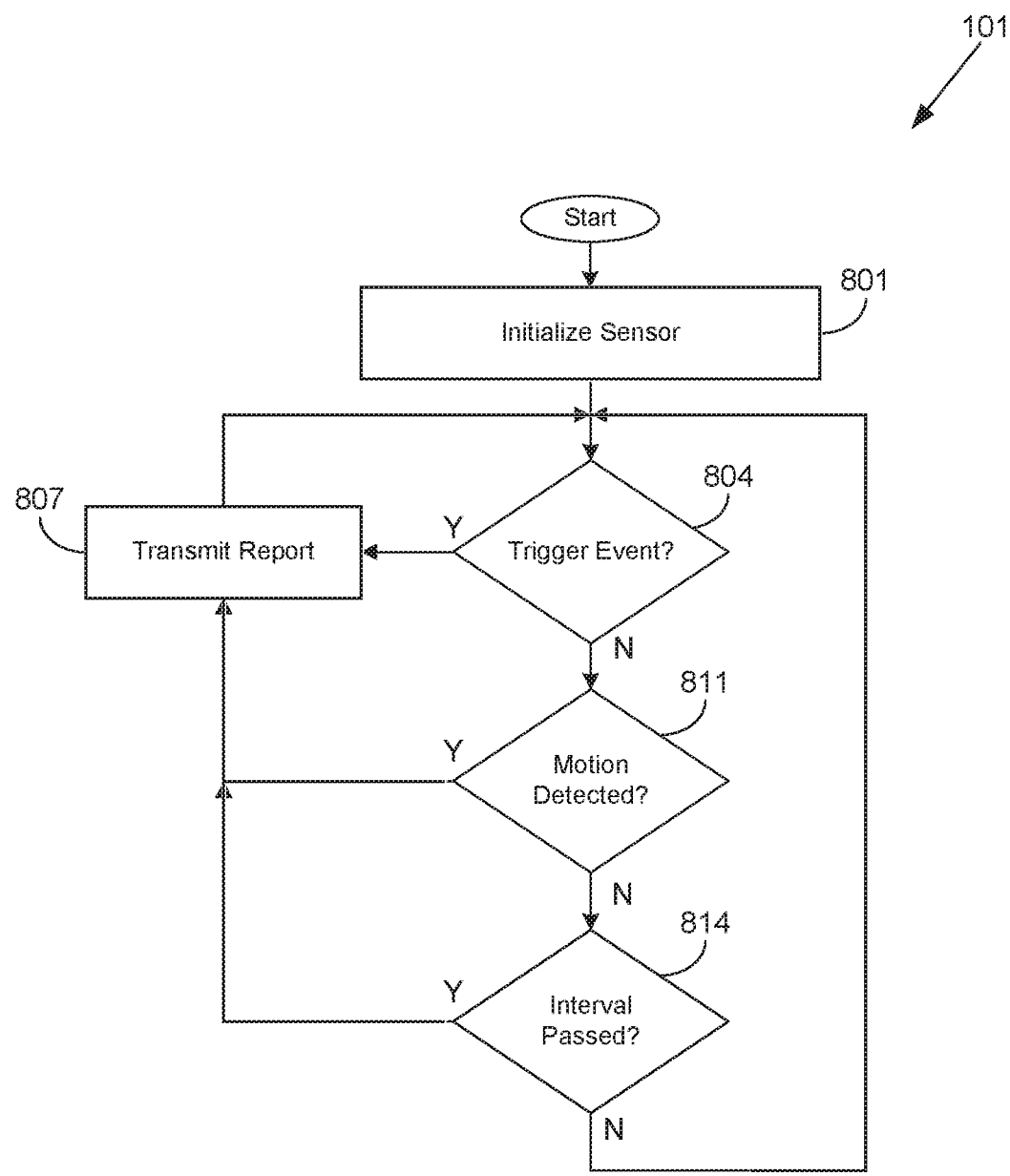
FIG. 8 is a flowchart illustrating one example of functionality implemented by a trap monitor according to various embodiments of the present disclosure.

Moving on to FIG. 8, shown is a flowchart that provides one example of the operation of a portion of the trap monitor 101 according to various embodiments. It is understood that the flowchart of FIG. 8 provides merely an example of the many different types of functional arrangements that may be employed to implement the operation of the portion of the trap monitor 101 as described herein. As an alternative, the flowchart of FIG. 8 may be viewed as depicting an example of elements of a method implemented in the trap monitor 101 according to one or more embodiments.

Beginning with box 801, the trap monitor 101 performs one or more initialization operations. This may be performed, for example, on a powering on or reset of the trap monitor 101, or in response to another event. Initialization operations may include performing diagnostic operations such as a battery check, or a verification of operability of the infrared receiver 511 (FIG. 5), motion sensor 111 (FIG. 1A), environmental sensors 514 (FIG. 5), magnetic flux sensors 504 (FIG. 5), or other components of the trap monitor 101. This may also include determining whether the trap monitor 101 is communicable with the central hub 611 (FIG. 6). For example, in embodiments in which the radio frequency transmitter 524 (FIG. 5) operates as a radio frequency transceiver, the trap monitor 101 may communicate a signal or data requesting acknowledgement to the central hub 611. The trap monitor 101 may then receive an acknowledgement (ACK) signal or packet from the central hub 611.

Next, in box 804, the trap monitor 101 determines if a trigger event has occurred. In some embodiments, this includes the trap monitor 101 determining if the magnetic flux sensor 504 has detected any change in magnetic flux. In such an embodiment, it is assumed that the detected change in magnetic flux is caused by a magnet 124 (FIG. 1A) of a magnetic interlock 117 (FIG. 1A) connected to a movable portion of a trap, as is described above. In other embodiments, the trap monitor 101 may be configured to report trigger events in response to motion detected by the motion sensor 111 (FIG. 1A), such as when the trap monitor 101 is deployed in a multitrap. If a trigger event has occurred, the process advances to box 807 where a report 613 (FIG. 6) indicating the trigger event is transmitted to the central hub 611 (FIG. 1). Otherwise, the process advances to box 811 where the trap monitor 101 determines if motion is detected by the motion sensor 111.

In some embodiments, as was described above, the detection of motion by the motion sensor 111 may cause a trigger event. In other embodiments, motion may be detected as a separate event. Thus, the trap monitor 101 can detect and report motion for an untriggered trap, or after a trap has been triggered. If motion is detected, the process advances to box 807 where a report 613 indicating the detected motion is transmitted to the central hub 613. Otherwise, the process advances to box 814, where the trap monitor 101 determines if a predefined interval has passed. If not, the process returns to box 804 to determine if a trigger event has occurred. Otherwise, if a predefined interval has passed, the trap monitor 101 transmits a report 613 to the central hub 611. Such a report 613 may include, for example, temperature data, humidity data, dew point data, or other data from environmental sensors 514. Additionally, such a report 613 may include operational data such as a battery level, diagnostic data, or other data. Although these attributes are described as being included in a report 613 transmitted in response to the passage of a predefined interval, it is understood that these attributes may also be included in reports 613 transmitted in response to a trigger event or a motion detection as described in boxes 804 and 811, respectively.

Figure 9:
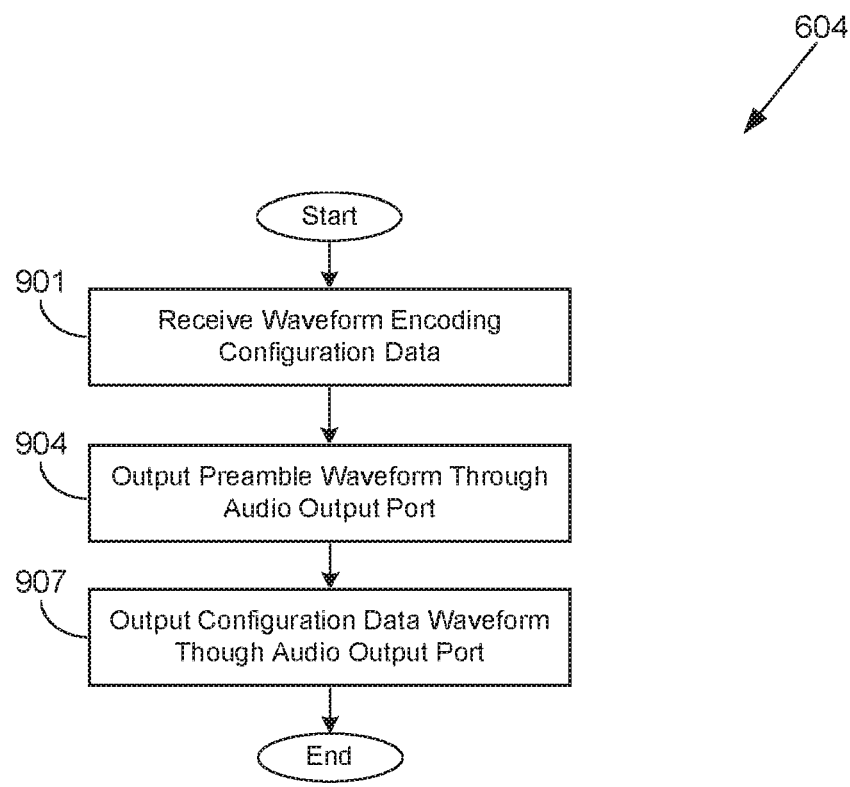
FIG. 9 is a flowchart illustrating one example of functionality implemented by a mobile device of the system of FIG. 6 according to various embodiments of the present disclosure.

Turning now to FIG. 9, shown is a flowchart that provides one example of the operation of a portion of the mobile device 604 according to various embodiments. It is understood that the flowchart of FIG. 9 provides merely an example of the many different types of functional arrangements that may be employed to implement the operation of the portion of the mobile device 604 as described herein. As an alternative, the flowchart of FIG. 9 may be viewed as depicting an example of elements of a method implemented in the mobile device 604 according to one or more embodiments.

Beginning with box 901 the mobile device 604 receives an audio waveform encoding configuration data 614 (FIG. 6) for a central hub 611 (FIG. 6) and/or a trap monitor 101 (FIG. 1A). The waveform may be downloaded from a server 601 (FIG. 1) through a browser application, dedicated application, or by another approach. The waveform may also be pushed or otherwise transmitted to the mobile device 604 from the server 601. Next, in box 904, the mobile device 604 outputs a waveform encoding a preamble signal through an audio output port. When fitted with an infrared transmitter 624 (FIG. 6), the waveform audio is transformed into an infrared signal for receipt via an infrared receiver 625 (FIG. 6). In some embodiments, the central hub 611 or trap monitors 101 may be configured to activate their infrared receivers 625 at a predefined interval. In such an embodiment, the mobile device 604 will transmit the preamble signal for a duration meeting or exceeding the predefined interval. On receipt of the preamble signal, the trap monitors 101 and central hub 611 will maintain active infrared receivers 625 in order to receive configuration data 614.

Next, in box 907, the mobile device 604 transmits an infrared signal encoding the configuration data 614. This may be performed by playing or otherwise rendering the audio waveform encoding of the configuration data 614 such that the output audio is transformed into an infrared signal by the infrared transmitter 624 connected to the audio output port of the mobile device 604. After transmitting the configuration data 614, the process ends.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A monitor for use with a pest control device comprising:
   an enclosure having a recess;
   processing circuitry disposed within the enclosure;
   an RF transceiver electrically connected to the processing circuitry;
   an infrared sensor having passive and active capabilities disposed on the processing circuitry and extending through the enclosure, the infrared sensor configured to detect motion;
   a magnetic flux sensor electrically connected to the processing circuitry, the magnetic flux sensor configured to detect a change in magnetic flux in an area adjacent to the magnetic flux sensor; and
   an interlock removably fittable within the recess and configured to attach to a movable portion of a pest control device, the interlock configured to provide the change in magnetic flux;
   wherein the enclosure is configured to be located adjacent to the pest control device.

2. The monitor of claim 1, wherein the infrared sensor is configured to detect motion within an area.

3. The monitor of claim 2, wherein the area is defined as the interior of a trap.

4. The monitor of claim 1, wherein the infrared sensor and the magnetic sensor communicate a detection event to the processing circuitry.

5. The monitor of claim 4, wherein the RF transceiver is configured to communicate the detection event to a server accessible to a user by a client device.

6. The monitor of claim 5, wherein the client device is a mobile device.

7. A monitor for use with a rodent trap comprising:
   an enclosure having an interior, an exterior, and a recess, the enclosure configured to be coupled to a rodent trap;
   a motion sensor disposed within the interior and extending through one face of the enclosure such that the motion sensor detects motion near the motion sensor as a detection event;
   an RF transceiver electrically connected to the motion sensor and configured to wirelessly communicate with a server, the RF transceiver configured to communicate the detection event to the server; and
   a magnetic flux sensor disposed within the interior of the enclosure proximate the recess;
   an interlock removably disposed within the recess on the exterior of the enclosure and configured to attach to a movable portion of the rodent trap, the interlock configured to provide a change in magnetic flux to the magnetic flux sensor.

8. The monitor of claim 7, wherein the magnetic flux sensor is configured to respond to removal of a magnet attached to the interlock.

9. The monitor of claim 8, wherein the RF transceiver, the motion sensor, and the magnetic flux sensor are operably connected to processing circuitry.

10. The monitor of claim 7, further comprising processing circuitry disposed within the enclosure.

11. The monitor of claim 7, wherein the server is configured to be accessible to a user via a client device.

12. The monitor of claim 11, wherein the client device is a mobile device.

13. A method of detecting the presence of a rodent within a rodent trap, comprising the steps of:
   attaching a pest control monitor to a rodent trap, the pest control monitor including:
      an enclosure having a recess in an exterior of the enclosure, the enclosure configured to be coupled to a rodent trap;
      processing circuitry disposed within the enclosure;

a motion sensor electrically coupled to the processing circuitry;

an RF transceiver electrically coupled to the processing circuitry;

directing the motion sensor toward an interior of the rodent trap;

detecting a pest within the rodent trap by detecting motion within the rodent trap;

placing an interlock in the recess, the interlock configured to attach to a moveable portion of the rodent trap;

detecting a pest within the rodent trap by detecting removal of the interlock from the recess by a flux sensor on the interior of the enclosure;

recording the pest detection as a detection event;

communicating the detection event to the processing circuitry; and relaying the detection event from the processing circuitry via the RF transceiver to a hub that is configured to be accessible by a user through a client device.

14. The method of claim 13, wherein the relaying step further comprises the steps of:

relaying an electrical signal from the motion sensor to the processing circuitry;

relaying the electrical signal from the processing circuitry to the hub; and relaying the electrical signal from the hub to a mobile device of a user.

15. The method of claim 14, wherein the relaying the electrical signal from the processing circuitry to the hub is accomplished through the use of the RF transceiver.

16. The method of claim 13, further comprising the step of communicating configuration data from the client device to the processing circuitry.

17. The method of claim 16, wherein the communicating configuration data step is accomplished through direct communication between the client device and the processing circuitry through the RF transceiver.

* * * * *